Jan. 2, 1968  G. PERKINS, JR., ETAL  3,360,904
SAMPLE FRACTIONATING APPARATUS
Original Filed Sept. 17, 1964  2 Sheets—Sheet 1
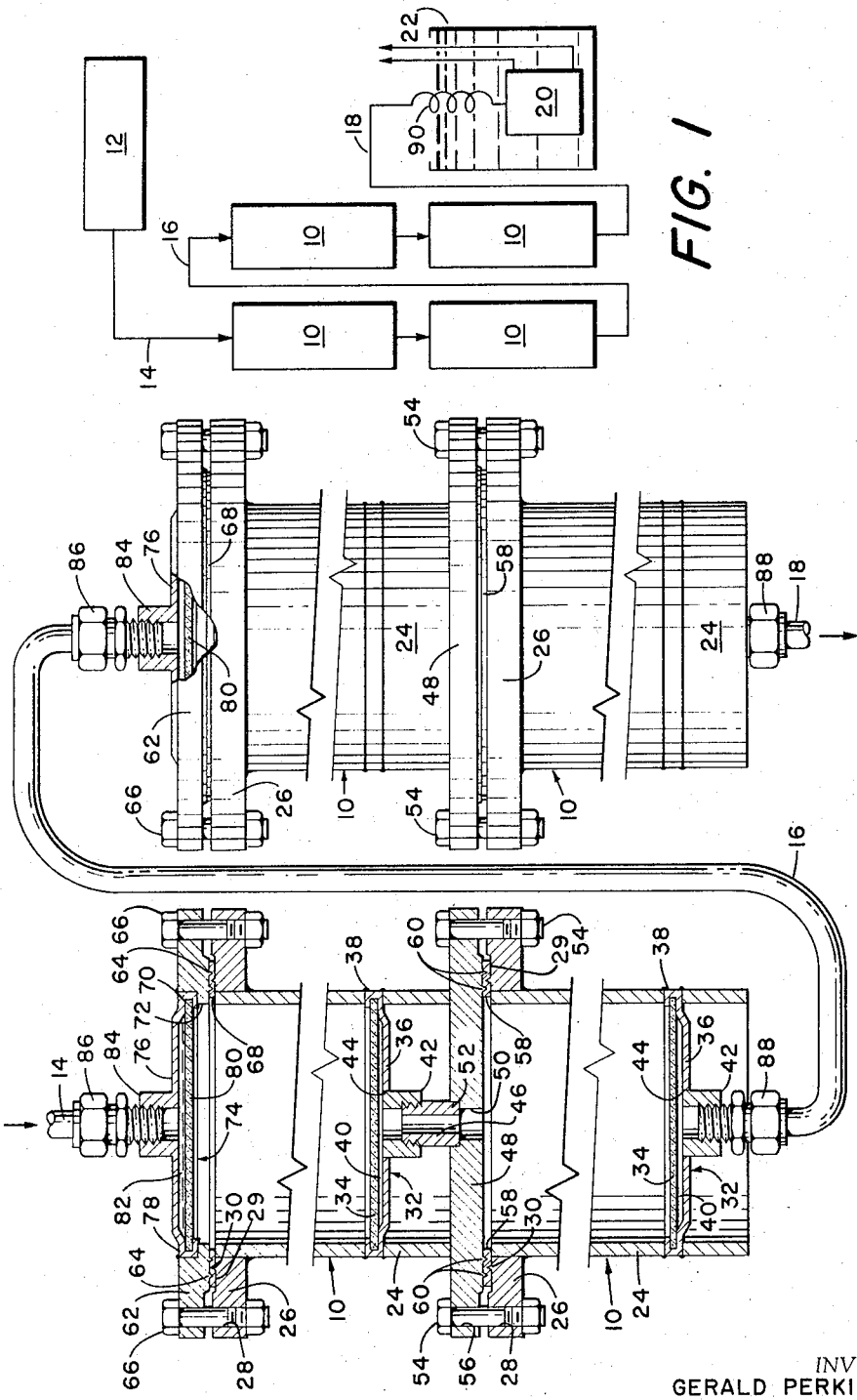
INVENTORS.
GERALD PERKINS JR.
ALFRED B. CAREL
BY
ATTORNEY

United States Patent Office 3,360,904
Patented Jan. 2, 1968

3,360,904
SAMPLE FRACTIONATING APPARATUS
Gerald Perkins, Jr., and Alfred B. Carel, Ponca City, Okla., assignors to Continental Oil Company, Ponca City, Okla., a corporation of Delaware
Original application Sept. 17, 1964, Ser. No. 397,142, now Patent No. 3,315,736, dated Apr. 25, 1967. Divided and this application Aug. 22, 1966, Ser. No. 585,705
4 Claims. (Cl. 55—197)

ABSTRACT OF THE DISCLOSURE

Chromatographic apparatus comprises a plurality of serial columns and a sample trap, the latter comprising a housing with a sparger and liquid dip leg on the sample inlet.

Disclosure

This is a division of application Ser. No. 397,142, filed Sept. 17, 1964, and now U.S. Patent 3,315,736, issued Apr. 25, 1967.

The present invention relates to apparatus for fractionating chemical samples and, more particularly, the present invention relates to apparatus for preparing relatively pure chemical compounds by chromatographic resolution, or selective vapor condensation, or by a combination of these techniques.

Recently many innovations have been made in techniques for chemical analysis. One of the more significant of such innovations has been the extension of the analytical uses of the chromatographic phenomenon, including the application of this phenomenon in both capillary and packed partition columns. Although the capillary columns have been found to be useful in the analysis of relatively small chemical samples, the packed columns have been found most useful in the isolation of relatively large quantities of sample. For instance, proposals have recently been made for the utilization of packed type partition columns for the preparation of commercial quantities of relatively pure chemical reagents.

In spite of the rapid growth in applications of the packed chromatographic column, certain problems have, until the present invention, presented themselves as major obstacles to the wide application of this type apparatus and technique. For instance, the preparation of a packed chromatographic column is, under some circumstances, rather tedious and difficult. For instance, it will often be found desirable to change either the size or type of the particles which are packed into the column or, either with or without a change in the type of such particles, to change the partitioning agent with which such particles are coated. The packing of these columns must be accomplished without undue stratification of the material within the column while at the same time a relatively uniform pore space matrix must be maintained from the top to the bottom of the column. These requirements have manifested themselves as substantial operating problems when columns of relatively long length are utilized.

In addition to the problems which have been encountered in preparation of the packed chromatographic column, other problems no less formidable have been encountered in the entrapment and recovery of the chemical constituents as they emerge serially from the chromatographic column. Condensing traps are widely used for this purpose and may consist of spirals, baffles, glass beads, glass wool, Vigreux indentation or may use counter-current flow to condense the vapors emerging from the column. Unfortunately, however, this type of apparatus has been subject to several inherent problems. For instance, the pressure drop within such apparatus has been found to be undesirably high, while the purity of the carrier gas effluent from such traps has not proved to be as high as would be wished. This latter shortcoming of traps of the type previously used has necessitated the use of a plurality of traps in serial arrangement when it was desired to obtain a relatively high percentage of sample recovery, or in situations where it was desired to recycle the carrier gas through the chromatographic column. Such duplication of equipment is, of course, undesirable, both from the standpoint of capital investment, and from the standpoint of man-hours which must be spent in setting up the apparatus. Unfortunately, however, until the present invention, a versatile chromatographic system having quickly changeable packing material and further having an efficient sample trap has remained an elusive desideratum.

It is, therefore, an object of the present invention to provide improved apparatus for the isolation and entrapment of chemical samples.

An additional object of the present invention is to provide chromatographic apparatus which has versatility far exceeding that of prior art chromatographic equipment.

Still another object of the present invention is to provide apparatus for isolating chemical samples without attendant high energy losses due to pressure drops thereacross.

A further object of the present invention is to provide chromatographic apparatus for recovering a relatively large percentage of chemical samples which are introduced to a chromatographic column.

Yet another object of the present invention is to provide apparatus for efficiently condensing a chemical sample from a carrier gas as it emerges from a chromatographic column.

An additional object of the present invention is to provide apparatus capable of separating a condensable chemical sample from a carrier gas which may then be recycled into a chromatographic column without the necessity for additional purification.

Other objects, aspects and advantages of the present invention will become apparent from a reading of the more detailed description of one embodiment of the invention presented hereinafter.

An example of apparatus embodying the present invention which is capable of implementing the above objects may be broadly summarized as comprising a plurality of chromatograph sections in serial communication with each other. Each adjacent pair of column sections are joined through connecting means which includes means for providing a fluid-tight seal containing fluids within the body of the column sections, but not obstructing fluid flow between the sections. In addition, each of the sections has formed at the lower portion thereof a chamber consisting of a cover which is spaced from a porous disk within the interior of each of the housings. A condensation trap which comprises a housing having a floor mounted opposite the inlet end of the trap communicates with the plurality of columns on the downstream end thereof. In a preferred embodiment of the invention, a closure is provided at the inlet end of the trap which comprises a porous disk and a cover spaced therefrom. A gas outlet tube is provided in the upper portion of the housing near the porous disk while a fluid outlet tube communicates with the interior of the lower end thereof. Means for maintaining a low temperature is provided surrounding the housing.

A more detailed understanding of the present invention may be obtained from a reading of the following description of one embodiment of apparatus utilizing the principles of the invention. As an aid to understanding this detailed description, the following drawings are presented wherein:

FIGURE 1 is a schematic representation of one form of apparatus utilized in this invention showing the relationship to a carrier gas flow pattern of the various elements of the apparatus.

FIGURE 2 is an enlarged elevational view, partly in section, showing sections of the gas chromatographic column which appears in FIGURE 1. The internal structure of the column and the means for securing the column sections together are disclosed in this figure.

Figure 3:
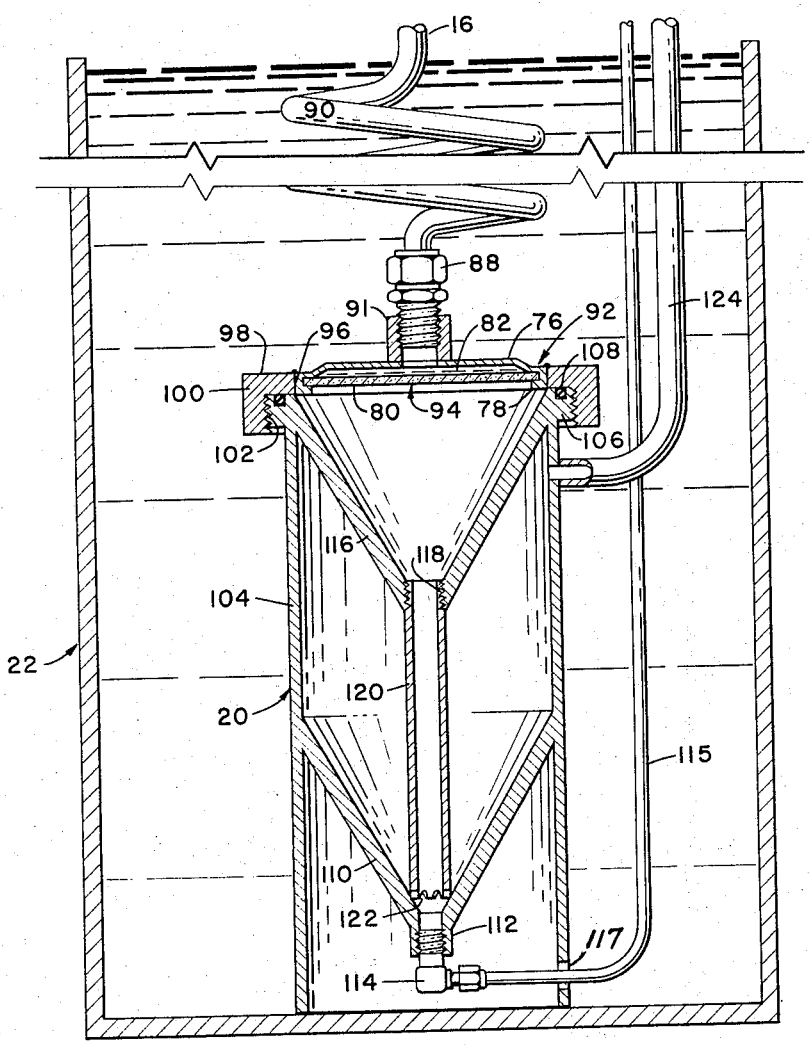
FIGURE 3 is an enlarged cross-sectional view of a preferred embodiment of the condensation trap shown schematically in FIGURE 1, which view shows the structural details of the various elements of the trap.

Referring now to the drawings, there is shown in FIGURE 1 a schematic representation of one manner in which structural elements may be assembled in practicing the present invention. More particularly, there is shown a plurality of sections 10 of a gas chromatographic column through which is passed a carrier gas carrying a sample. This carrier gas may be from any suitable source 12 from which it is ducted to the chromatographic column through suitable conduit means 14. In the arrangement of components shown in FIGURE 1, at the bottom portion of the lower left-hand section 10, is provided a crossover conduit 16 which communicates with the interior of the upper right-hand chromatographic section 10. A conduit 18 provides communication with the sections 10 and a condensation trap indicated generally by the numeral 20. Means are provided for maintaining the trap 20 at a low temperature and, in the embodiment shown in FIGURE 1, such means comprise a water bath indicated generally by numeral 22.

The chromatographic column portions shown in FIGURE 1 are shown in further detail in FIGURE 2 where it may be seen that each of the sections 10 comprises a cylindrical sleeve 24 having a flange 26 secured at the upper portion thereof by any suitable means as, for instance, by welding. Each of the flanges 26 is provided with a plurality of apertures 28 near the outer periphery thereof. In addition, the upper surfaces of flanges 26 are machined in the area immediately adjacent sleeve 24 to form a sealing surface 29 containing at least one ridge 30.

Located near the lower portion of each of the cylindrical sleeves 24 is a sparger assembly indicated generally by the numeral 32 which is similar in structure and purpose to the sparger units disclosed and claimed in U.S. patent application Ser. No. 304,103 filed Aug. 23, 1963, entitled "Vapor Phase Chromatographic System," by Alfred B. Carel. In the present structure, the sparger assemblies 32 each comprises a porous metallic plate or disk 34 which is held in position by a cover member 36, the outer periphery of which is bent into a lip 38 to enclose the outer periphery of disk 34 and to hold the disk against movement within the sections 10. Alternatively, the disk 34 and cover member 36 can be welded to the cylindrical sleeve 24 or otherwise permanently secured thereto in the illustrated position. A portion of the cover member 36 is spaced from disk 34 in order to form an open chamber 40 which allows even distribution of fluids within sleeves 10.

Means are provided for holding adjacent sections 10 in rigid axial alignment. In the structure shown in FIGURE 2 such means comprise an internally threaded collar 42 which is rigidly held within an aperture 44 formed in the central portion of cover member 36. An exteriorly threaded nipple 46 is threadedly engaged by the collar 42. A disk-like plate 48 having an axial aperture 50 therein is located immediately subjacent nipple 46 with a portion of the nipple extending into a threaded counterbore 52 of aperture 50. Plate 48 is secured to flange 26 of the subjacent section 10 by means of a plurality of headed bolts 54 which pass through a plurality of apertures 56 formed in the outer periphery of plate 48. A gas-tight seal is provided between the sections 10 by means of an annular, soft metal gasket 58 which is deformed by the action of ridges 30 which cooperate with a plurality of corresponding ridges 60 formed on the lower surface of plate 48.

The same general type of structure utilized to hold adjacent sections 10 together is also utilized at the upper portion of the initial or uppermost section 10 to maintain a fixed relationship between that initial section and the inlet conduit 14. Thus, an annular plate 62 having sealing ridges 64 formed on the underside thereof is mounted on flange 26 by a plurality of bolt assemblies 66. A fluid-tight seal is formed between plate 62 and flange 26 by the cooperation of ridges 30 and 64 as they are drawn together by bolt assemblies 66 into contact with a malleable metal gasket 68.

Located in a counterbored portion 70 of an aperture 72 formed in plate 62 is a sparger assembly indicated generally at 74. The sparger assembly 74 comprises a cover 76 having a peripheral lip 78 formed around the outer periphery thereof to position and hold a porous metal disk 80. As shown in FIGURE 2, cover 76 is elevated away from the central portion of disk 80 in order to form a fluid-tight chamber 82. Communicating with chamber 82 is an internally threaded connecting member 84 which receives a nipple assembly 86 which assembly functions to hold conduit 14 in fixed communication with the interior of chamber 82.

At the lower portion of the left-hand series of sections 10 as viewed in FIGURE 2 is an additional nipple assembly 88 which is connected to cover member 36 and communicates with chamber 34. Crossover conduit 16 is secured by the lower nipple assembly 88 to sparger assembly 32 and functions to place sparger assembly 32 in communication with a second series of sections 10 as shown in FIGURE 2 to the right of the initial series. An examination of FIGURE 2 will indicate that the elements shown in the right-hand series of sections 10 are substantially identical to the corresponding elements in the left-hand series. Consequently, no further description of this series of column sections will be given except to note that corresponding elements between the two series have been assigned the same numerical designation.

The nipple assembly 88 located at the lower portion of the right-hand series of chromatographic column 10 holds conduit 18 in communication with the interior of the lowermost chromatographic column section. The opposite end portion of the conduit 18 is spirally or helically coiled as indicated at 90 just prior to connection of the conduit to the condensation trap 20.

The details of construction of a preferred embodiment of the condensation trap 20 used in the present invention may be best perceived by referring to FIGURE 3 of the drawings. The end of the conduit 18 is connected by another of the nipple assemblies 88 to a connecting member 91 carried by a trap closure designated generally by reference character 92. The closure 92 comprises a sparger assembly 94 which is substantially identical to the sparger assembly 74 located at the top of the left-hand series of column sections 10 illustrated in FIGURE 2. Thus, the sparger assembly 94 includes a cover plate 76 which has an overturned peripheral lip 78 which encloses a porous metallic disk 80 and defines therewith a gas-tight chamber 82. The sparger assembly 94 is welded or otherwise suitably secured in an annular aperture 96 formed in the center of a top cap 98 forming a part of the trap closure 92. The top cap 98 has a downwardly extending annular flange 100 around the outer periphery thereof, and the flange 100 carries a radially inwardly facing tread 102.

An elongated, generally cylindrical housing 104 is provided with a radially outwardly extending annular flange 106 at the upper end thereof, which flange is threaded to mate with the thread 102 carried by the top cap 98. The top cap 98 may thus be threadedly secured to the housing 104, and a suitable O-ring 108 or other suitable sealing member is interposed between the upper end of the housing 104 and the top cap 98 to provide an effective seal between these elements.

The housing 104 contains a floor 110 which in the illustrated embodiment assumes the form of a frustum of a cone. The frusto-conical floor 110 is secured to or formed integrally with the housing 104 at its enlarged open, upper end and is provided with a threaded female connection 112 at its relatively smaller lower end. A suitable threaded male connection 114 is used to connect the connection 112 with a liquid outlet tube 115 containing a valve, which outlet tube is used to remove liquid accumulated on the floor 110 of the trap 20 in a manner hereinafter described in greater detail. The housing 104 is provided with a relatively large opening 117 through which the outlet tube 115 extends so that the coolant fluid from the water bath 22 can enter the housing and contact the lower side of the floor 110. Additional openings may be provided in the lower portion of the housing 104 for this purpose if desired.

In the upper end of the housing 104 and directly subjacent the trap closure 92, a baffle plate 116 is mounted and contains a centrally positioned aperture 118. In the illustrated embodiment of the invention, the baffle plate 116 is frusto-conical in configuration and is coaxially aligned with the frusto-conical floor 110. The enlarged, open, upper end of the frusto-conical baffle plate 116 is formed integrally with, or otherwise suitably secured to, the upper end of the housing 104.

A tube 120 is threadedly received by the threaded aperture 118 and extends downwardly therefrom, terminating in close proximity to the lower end of the frusto-conical floor 110. A plurality of semicircular holes or serrations 122 are formed in the lower end of the tube 120 for permitting gas to readily escape therefrom as hereinafter described. Preferably, the total area of the semicircular holes 122 is greater than the inside cross-sectional area of the tube 120. The tube 120 can thus be extended into abutting contact with the lower end of the frusto-conical floor 110 and fluid moving downwardly in the tube can escape therefrom through the semicircular holes 122. For the purpose of removing carrier gas from the trap 20 as hereinafter described, an outlet tube 124 is connected to the upper end of the housing 104 and communicates with the interior thereof. A suitable valve is provided in the outlet tube 124 for a purpose hereinafter described.

The coil 90, trap 20 and two outlet tubes 115 and 124 are all suspended in the water bath 22 and are surrounded by chilled water suitable for retaining the trap interior at a relatively low temperature. Of course, other types of refrigerant can be used, depending on the nature of the components which are to be condensed in the trap 20.

Operation

In the operation of the fluid chromatography apparatus of this invention, one embodiment of which is depicted in the accompanying drawings, a sample is vaporized and entrained in a suitable carrier gas from the source 12 by techniques presently used in the art. The vaporous mixture is introduced to the top of the uppermost chromatograph column section 10 in the left-hand bank of sections (FIGURE 2) via the sample inlet conduit 14. The gaseous sample, generally consisting of an intimate mixture of several individual vaporized components, flows through the nipple assembly 86 into the chamber 82 between the porous disk 80 and the cover 76. A pressure drop occurs across the disk 80, and flow of the sample and carrier gas into subjacent column section 10 is retarded. Thus, the chamber 82 between the disk 80 and the cover 76 will be completely filled with the sample and carrier gas, and the sample will be evenly distributed across the entire cross-sectional area of the column section 10 at the top thereof. Due to the uniformity of sample distribution at the top of the column, the sample moves downwardly in the column with an even frontal movement.

As the gaseous mixture moves downwardly in the uppermost column section 10 from the porous disk 80, it contacts a preselected packing material (not shown) located between the upper sparger assembly 74 and the lower sparger assembly 32 in the column section. The gaseous mixture is resolved into its several components by contact with the column packing by reason of the different absorption coefficient of each of the sample components in the column packing material. As a result of the resolution of the gaseous mixture into its several individual components, the leading edge, or line of farthest advance downwardly in the column, of each of the several components will become distorted due to the fact that a portion of the leading edge which is adjacent the wall of the column will move downwardly in the column more rapidly than that portion of the leading edge which is in the center of the column. In other words, the frontal pattern assumed by each component as it moves through the column will generally resemble an inverted U or V. The phenomenon of more advancement of the leading edge of the separated component at the walls of the column than at the center thereof is well known to those skilled in the art. It is also recognized that the gases adjacent the wall of the column are generally warmer than those at the center of the column, particularly, of course, where the column is heated above ambient temperatures.

The sparger assembly 32 disposed in the lower portion of each of the column sections 10 functions to reshape the front or leading edge of each of the components passing through the column so that the leading edge is more nearly equally advanced at all points across the column. The sparger assembly 32 also functions to mix the hotter gases adjacent the peripheral wall of the column with the cooler gases moving through the center of the column along the column axis. These functions of the sparger assembly 32 are repeated by each of the sparger assemblies 32 which are located downstream in the serially connected column sections 10, and the number of sections 10 employed in a given situation will depend upon the qualitative and quantitative character of the particular sample which is to be resolved. The use of a plurality of the sections 10 is particularly desirable where the diameter of the annular sleeves 24 of the sections is large since the distortion which occurs in the leading edges of the components is proportional to the diameter of the column. In other words, the leading edge of the component which is adjacent the wall of the column tends to become separated from the central portion of the leading edge in proportion to the distance by which the column axis is separated from the wall of the column.

The novel construction of each of the serially connected column sections 10 of the present invention greatly improves the versatility of this type of chromatographic apparatus, and substantially reduces the difficulty and expenditure of time which has heretofore characterized the provision of additional packed lengths of column, or the replacement of the packing material in the column. Thus, the sections 10 can be quickly detached from each other by removal of the bolts 54, and sections may be added or removed to provide combinations of packing materials in different sections of the column without the requirement for unpacking and repacking a single, integrally formed column. Since each column section 10 is an individual unit unto itself and is individually packed, the magnitude of the packing weight borne by each sparger assembly 32 is minimal and excessive compaction of the packing material in the lower end of the column formed by serially interconnecting the sections does not occur.

Each of the column sections 10 may be sealed with a blind cap or closure member and stored to preserve the packing material in the interior thereof for future use. It is not necessary to remove the sparger assemblies 34 which are permanently mounted in the sections 10. When the column sections 10 are disconnected and stored, the assemblies 34 are thus not disturbed and retain their original position in the section. The provision of the soft or malleable annular metallic plates 62 between the flanges 26 and plates 48 of the column sections 10 eliminates the previous practice of using O-rings for connections of this general type. There is thus provided a gas-tight joint or connection which is characterized in having a high resistance to corrosive samples passed through the column at high temperatures, and therefore, in having a longer effective service life. The metallic plates 62 also provide a much stronger and reliable seal when the column is operated at high pressure.

The construction of each of the column sections 10 is such that each of the sections is adapted to receive a cover unit of the type used at the upper end of the initial column section 10. Thus, where available space for assembly and use of the column is limited, the column sections 10 may be assembled in side-by-side groups, such as the two banks illustrated in FIGURE 2. The adjacent banks may then be interconnected by a suitable crossover conduit, such as the conduit 16 illustrated in the drawings. It will be apparent that instead of the two banks each containing two serially interconnected column sections 10 as depicted in FIGURE 2, any number of banks containing any number of column sections could be interconnected in substantially the same manner.

After the carrier gas and the several components of the sample have been passed through the serially interconnected column sections 10, and have thus passed through the sparger assembly 32 located in the lower part of the last section through which the gas is passed, the gaseous effluent from the column moves through the conduit 18 to the spiral or helical coil 90 formed in this conduit. The coil 90 is immersed in the cooling liquid contained in the water bath 22. The hot effluent gases from the column are thus lowered in temperature, and some of the higher boiling components thereof will commence to condense out in the coil 90. From the coil 90, the gases and any liquid condensate present enter the chamber 82 defined between the cover 76 and the porous disk 80 of the sparger assembly 94.

The porous plate or disk 80 of the sparger assembly 94 of the trap closure 92 functions as a condensing element for condensing purified fractions from the chromatographic column made up by the sections 10, and also for efficiently separating the carrier gas from the sample components. As the gas from the chamber 82 passes through the porous disk 80, its velocity is greatly reduced, and it is distributed through the multitude of pores formed in the porous disk. The decrease in gaseous velocity allows the gas a greater contact time with the relatively cool porous disk 80, and thus results in efficient condensation of the condensable components. The employment of the sparger assembly 94 in the closure 92 at the upper end of the trap 20 has the further advantage of achieving condensation while requiring only a relatively low pressure drop across the disk. For example, one type of porous stainless steel disk which has been employed in the trap 20 produces a pressure drop of 0.1 pound per square foot at a flow rate of 35 cubic feet of air per minute. Moreover, the surface area of the disk 80 contacted by the gases in passing therethrough is much greater and more uniform than the contacted surface area which is normally available in conventional traps of the Vigreux, baffle, spiral or countercurrent types.

After passing through the sparger assembly 94 forming part of the closure 92 at the upper end of the trap 20, the gases and liquified sample components enter the frusto-conical baffle 116 where condensation of some of the as yet uncondensed sample components may occur by contact with the cool surface of the baffle. The liquid materials are channeled by the baffle 116 downwardly into the tube 120. Further opportunity for condensation occurs in the tube 120. At the lower end of tube 120, both the liquid and gaseous materials are emitted through semicircular holes 122 into the lower portion of the frusto-conical floor 110. By controlling the rate of withdrawal of the liquid from the floor 110 through the outlet tube 115 and valve, liquid may be permitted to accumulate on the floor until it reaches a level well above the end of the tube 120. The carrier gas discharged through the semicircular holes 122 at the lower end of the tube 120 must thus pass through the body of liquid accumulated in the lower portion of the floor 110 before entering the outlet tube 124. It is thus scrubbed by contact with the liquid so that any residual condensable components remaining in the carrier gas at this point may be removed by condensation.

In the preferred manner of operating the trap 20, the water or other cooling medium contained in the bath 22 is retained at a temperature such that the temperature of the condensed liquid which occupies the lower portion of the floor 110 and covers the lower end of the tube 120 will be at a temperature only slightly higher than the freezing point of the highest melting sample component which is to be removed from the carrier gas by condensation. It should be further pointed out that as the several resolved sample components are sequentially eluted from the chromatographic column and enter the trap 20, it may be desirable to sequentially vary the temperature of the cooling medium so as to retain the condensed liquid covering the lower end of the tube 120 at the lowest temperature which can be employed without converting any of the material discharged from the tube 114 to the solid state.

In a further alternative mode of operation the valve in outlet tube 115 can be closed at the time one particular individual component of the gaseous sample commences to be discharged from the end of the tube 120. The liquified component will then continue to accumulate on the floor 110 until substantially all of the component is collected at this location. The valve in outlet tube 124 can then be closed and the valve in outlet tube 115 later opened to permit the carrier gas pressure to build up in the housing over a short period of time, then forcible eject the liquified component into the outlet tube 115. In other words, for a short period between the passage of two successive resolved sample components into the trap 20, both the valves in tubes 115 and 124 can be closed to permit carrier gas pressure to be used to forcibly eject the leading component from the trap.

The embodiment of the trap 20 illustrated in FIGURE 3 and hereinbefore described is particularly useful in effecting the condensation of the resolved components of the gaseous sample where there is a tendency of such components to form aerosols. An example of this type of sample is one which consists essentially of, or contains, naphthenic acid esters. In the case of a few types of sample and carrier gas systems, the velocity retarding and condensation effect of the porous disk 80 used in the sparger assembly 94 at the upper end of the trap 20 will not provide the advantageous results which are characteristic of this arrangement with the great majority of systems subjected to chromatographic resolution. In these instances, the sparger assembly 94 may be removed and the tube 120 connected directly to the end of the conduit 18 downstream from the coil 90. The primary condensing effects are then achieved in the coil 90 and by the passage of the carrier gas through the liquid leg standing on the floor 110 at the lower end of the trap. Because of its utility in combination with the chromatographic column sections of the type hereinbefore described, it is also within the contemplation of the present invention to employ the described trap arrangement which does not incorporate the sparger assembly 94.

Although, in many instances, the carrier gas discharged through the outlet tube 124 will be sufficiently purified in passing through the trap 20 to permit it to be re-used by recycling through the column, it is also within the contemplation of the invention to provide a plurality of traps 20 serially interconnected when it is desired to obtain an even higher degree of purification of the carrier gas.

The chromatographic apparatus of the invention has been described in considerable detail, and certain specific embodiments of the invention have been illustrated and described as exemplary of the manner in which the principles underlying the invention may be practicably employed. Those skilled in the art will, however, undoubtedly perceive a variety of ways in which the specific embodiments herein dscribed may be modified or altered without an abandonment of the principles upon which the invention is founded. It is therefore intended that all such modifications and innovations as do not depart from reliance upon the basic principles of the invention as the same are defined by the appended claims or reasonable equivalents thereof shall be deemed to be circumscribed by the spirit and scope of the invention.

What is claimed is:

1. Fluid chromatography apparatus comprising:
   a plurality of chromatograph column sections in serial communication with each other whereby fluid is passed serially therethrough from a first to a last section;
   means between each two adjacent column sections for releasably forming a fluid-tight seal between the interiors of said adjacent column sections;
   means secured to the upstream portion of said first section for introducing gas thereinto;
   a conduit secured to the downstream portion of said last section for removing fluid therefrom;
   a condensation trap communicating with said conduit, said condensation trap comprising:
      a housing;
      cooling means in thermal communication with an external portion of said housing;
      a floor mounted adjacent one end of said housing;
      a closure mounted on said housing at the opposite end thereof, said closure comprising:
         a porous plate adjacent the interior of said housing, and
         a cover having an inlet aperture formed therein in communication with said conduit, the portion of said cover surrounding said aperture being spaced from said porous plate to form a chamber therebetween;
      a first outlet tube mounted on said housing and in communication with the interior thereof, and
      a second outlet tube mounted on said housing and in communication with the lower portion of the interior thereof.

2. The apparatus defined in claim 1 wherein said means for forming a fluid-tight seal comprises:
   a plurality of mating ridges and grooves formed in the end portions of the adjacent sections;
   an annular gasket located between said sections adjacent said ridges and grooves; and
   means for drawing and holding said sections relatively together to squeeze said gasket between said ridges and grooves.

3. The apparatus defined in claim 2 wherein a water bath is provided around said condensation trap.

4. The apparatus defined in claim 3 wherein at least a portion of said conduit is coiled within said water bath.

References Cited

UNITED STATES PATENTS

| 1,715,854 | 6/1929 | McKenzie-Martyn | 285—363 X |
| 2,932,490 | 4/1960 | Olander | 165—115 X |
| 2,960,183 | 11/1960 | Kelley | 55—386 X |
| 2,989,443 | 6/1961 | Martin | 55—67 |
| 3,016,106 | 1/1962 | Luft | 55—386 X |
| 3,164,644 | 1/1965 | Ghetto et al. | 165—118 |
| 3,225,521 | 12/1965 | Burow | 55—197 X |
| 3,234,779 | 2/1966 | Dawson | 73—23.1 |
| 3,267,646 | 8/1966 | Kauss et al. | 55—197 |
| 3,267,647 | 8/1966 | Carel et al. | 55—197 |

FOREIGN PATENTS 603,598  6/1948  Great Britain.

REUBEN FRIEDMAN, *Primary Examiner.*

J. L. DE CESARE, *Assistant Examiner.*